United States Patent [19]

Stubbs, Jr. et al.

[11] Patent Number: 5,112,452
[45] Date of Patent: May 12, 1992

[54] REMOVAL OF THIOSULFATE FROM HYDROSULFITE SOLUTIONS

[75] Inventors: John L. Stubbs, Jr., Cleveland; Roger E. Bolick, II; Everett F. Hauser, Jr., both of Chattanooga, all of Tenn.

[73] Assignee: Olin Corporation, Cheshire, Conn.

[21] Appl. No.: 734,362

[22] Filed: Jul. 22, 1991

[51] Int. Cl.$^5$ .................................. C25B 1/14
[52] U.S. Cl. ........................... 204/92; 204/130
[58] Field of Search ........................ 204/92, 130

[56] References Cited

U.S. PATENT DOCUMENTS

| | | | |
|---|---|---|---|
| 4,470,888 | 9/1984 | Wheaton | 204/95 |
| 4,740,287 | 4/1988 | Cawlfield | 204/256 |
| 4,761,216 | 8/1988 | Cawlfield | 204/284 |
| 4,793,906 | 12/1988 | Bolick et al. | 204/92 |
| 4,976,835 | 12/1990 | Diaddario, Jr. et al. | 204/92 |
| 5,034,202 | 7/1991 | Knollmueller | 423/181 |

*Primary Examiner*—John Niebling
*Assistant Examiner*—David G. Ryser
*Attorney, Agent, or Firm*—Allen A. Meyer, Jr.; Paul Weinstein

[57] ABSTRACT

A process for treating an alkali metal hydrosulfite solution containing thiosulfate ions as an impurity which comprises reducing cathodically the alkali metal hydrosulfite solution to convert thiosulfate ions to sulfide ions, the alkali metal hydrosulfite solution having a residual alkalinity of from about 0.1 to about 20 grams per liter of hydroxide ion.

18 Claims, No Drawings

REMOVAL OF THIOSULFATE FROM HYDROSULFITE SOLUTIONS

BACKGROUND OF THE INVENTION

This invention relates to alkali metal hydrosulfite solutions. More specifically, this invention relates to alkali metal hydrosulfite solutions containing reduced amounts of undesirable thiosulfate ions.

DESCRIPTION OF THE PRIOR ART

Alkali metal hydrosulfites (dithionites) are commercially available bleaching agents which are particularly suitable for use in the pulp, textile, and clay industries.

Aqueous solutions of sodium hydrosulfite are used commercially for the bleaching of thermomechanical pulp and recycled de-inked paper. This reductive bleaching with sodium hydrosulfite is Preferred over oxidative bleaching processes using active oxygen or chlorine compounds. Bleaching with hydrogen peroxide as a source of active oxygen is more expensive and does not give superior increases in brightness. Pulp bleaching with chlorine or its derivatives requires a different chemical Pretreatment and, because environmentally objectionable halogenated organics are formed, bleaching processes using chlorine have come under increased scrutiny.

The reaction products formed in the reductive bleaching with hydrosulfites are much less objectionable, especially in continuous processes which recycle plant streams. All products present in hydrosulfite process effluents are ultimately converted to harmless sulfates by direct air oxidation or bacterial conversion processes.

Sodium hydrosulfite bleach solutions are produced by various processes, usually involving the reduction of sodium bisulfite solutions at pH levels around 6. In a specially designed electrolytic cell used in electrolytic processes, the reducing agents can be sodium amalgam or other selected metal cathodes. In chemical processes suitable reductants are sodium borohydride, zinc metal, or alkali metal formates. After the reduction step, the alkalinity of the product solution is adjusted upward to a pH above 9. This is commonly accomplished by the addition of between 1 and 6 grams/liter of an alkali metal hydroxide such as sodium hydroxide.

The bleaching of mechanical pulps has become the largest end-use for sodium hydrosulfite. Concern over corrosion of stainless steel, i.e. the 304SS family, has led to the identification of thiosulfate ion as a contributor. To protect their substantial investment, most mechanical pulp mills with 304SS equipment have devoted considerable effort to reduce thiosulfate concentrations. One of the sources of thiosulfate ion in a mechanical pulp process is the sodium hydrosulfite used to bleach the pulp. Thiosulfate ion is formed from hydrosulfite, and therefore present in small amounts in all hydrosulfite products marketed to that industry.

In commercial processes used to produce sodium hydrosulfite solutions, the sodium thiosulfate level in the final product is typically between 2 and 10 grams/liter. The maximum currently acceptable sodium thiosulfate content by most paper mills is around 2 grams/liter in the solution delivered as product. This level can be partially achieved, for example, by crystallization of the sodium hydrosulfite as its dehydrate and redissolving the dihydrate in a hydrosulfite slip stream. However, this approach also leaves an effluent enriched in sodium thiosulfate for re-use or disposal.

A removal or destruction process for thiosulfate ions in sodium hydrosulfite solutions is therefore desirable to achieve acceptable sodium thiosulfate levels in hydrosulfite bleaches, levels which may be further reduced by, for example, the pulp and paper industry. One process which is available to destroy thiosulfate ions in sodium dithionite solutions proceeds according to equation 1:

$$Na_2S_2O_3 + Na_2S_2O_4 + 4NaOH \rightarrow Na_2S + H_2O + 3Na_2SO_3 \quad (1)$$

In this process, sodium dithionite is the reducing agent and high concentrations of alkali, up to 1 molar or greater, are used, and the alkali treatment should be carried at around +30° C. for several hours. The disadvantage of this process is that there is still a large excess of alkali present in the hydrosulfite solution. This alkalinity may have to be reduced to optimize the product solution when used, for example, for Pulp bleaching. Also, some additional decomposition of hydrosulfite by the alkali may take place and further reduce the hydrosulfite concentration, proceeding via Equation 2.

$$3Na_2S_2O_4 + 6NaOH \rightarrow Na_2S + 5Na_2SO_3 + 3H_2O \quad (2)$$

Reducing agents such as sodium borohydride reduce bisulfite to hydrosulfite, but do not act on the sulfite ion present in an alkaline medium. Under alkaline conditions where hydrosulfite is stable, most reducing agents leave thiosulfate unchanged.

BRIEF DESCRIPTION OF THE INVENTION

Now is has been found that thiosulfate ions can be destroyed in a process for treating an alkali metal hydrosulfite solution which comprises reducing cathodically the alkali metal hydrosulfite solution, the alkali metal hydrosulfite solution having a residual alkalinity of from about 0.1 to about 20 grams per liter of hydroxide ion.

DETAILED DESCRIPTION OF THE INVENTION

The novel process of the present invention employs as one reactant an aqueous solution of an alkali metal hydrosulfite having undesirable concentration levels of thiosulfate ions. Suitable alkali metal hydrosulfites include sodium hydrosulfite, potassium hydrosulfite, lithium hydrosulfite and mixtures thereof. For the sake of simplicity, the process of the invention will be described using sodium hydrosulfite as the alkali metal hydrosulfite. Sodium hydrosulfite solutions treated by the process of the invention contain thiosulfate ion.

Typically, these solutions contain concentrations of thiosulfate ion of at least 1 gram per liter of alkali metal hydrosulfite solution, and usually from about 4 to about 12 grams of thiosulfate, depending on the manufacturing process used to produce the sodium hydrosulfite solution. As commercial products, these solutions contain from about 80 to about 160 grams of sodium hydrosulfite. Prior to treatment, the sodium hydrosulfite solution is alkaline and has an initial residual alkalinity of from about 0.1 to about 20, and preferably from about 1 to about 6 grams per liter of hydroxide ion. Residual alkalinity in the hydrosulfite solution may be provided by the addition of an alkali metal hydroxide, an alkaline earth metal hydroxide or mixtures thereof.

The residual alkalinity can be determined, for example, by admixing 1 ml. of the hydrosulfite solution in 100 mls. of de-aerated water and titrating the solution with hydrochloric acid to a pH of 9.2.

During operation of the process of the invention, sodium hydroxide may form to provide a source of residual alkalinity for the hydrosulfite solution.

Any electrolytic cell may be employed in the operation of the process of the present invention which provides separation of the anolyte solution from the hydrosulfite solution being treated and which serves as the catholyte.

Separators between the anolyte and catholyte are, for example, cation exchange membranes which permit the transfer of alkali metal ions from the anolyte to the catholyte.

Suitable cation exchange membranes are those which are inert, flexible and substantially impervious to the hydrodynamic flow of electrolyte and the passage of gas products produced in the cell. Cation exchange membranes are well-known to contain fixed anionic groups that permit intrusion and exchange of cations and exclude anions from an external source. Generally, the resinous membrane has a matrix or a cross-linked polymer to which are attached charged radicals, such as $-SO_3^{--}$, $-COO^-$, $-PO_3^{--}$, $-HPO_2^{--}$, $-AsO_3^{--}$ and $-Se_3^-$ and mixtures thereof. The resins which can be used to produce the membranes include, for example, fluorocarbons, vinyl compounds, polyolefins and copolymers thereof. Preferred are cation exchange membranes such as this comprised of fluorocarbon polymers having a Plurality of pendant sulfonic acid groups or carboxylic acid groups or mixtures of sulfonic acid groups and carboxylic acid groups.

The terms "sulfonic acid group" and "carboxylic acid groups" are meant to include salts of sulfonic acid or salts of carboxylic acid groups by processes such as hydrolysis. Suitable cation exchange membranes are sold commercially by E.I. DuPont de Nemours & Co., Inc., under the trademark "Nafion", by the Asahi Glass Company under the trademark "Flemion", by the Asahi Chemical Company under the trademark "Aciplex". Perfluorinated sulfonic acid membranes are also available from the Dow Chemical Company.

The anolyte which is electrolyzed in the anode compartment is any suitable electrolyte which is capable of supplying alkali metal ions and water molecules to the catholyte. Suitable as anolytes are, for example, alkali metal halides, alkali metal hydroxides or alkali metal persulfates, with alkali metal hydroxides being preferred. The concentration of the anolyte is not critical and dilute to concentrated solutions may be used. During operation of the Process, the transfer of alkali metal ions to the catholyte increases the alkalinity of the catholyte. Acidic solutions which provide cations such as alkali metals or protons to the catholyte may also be used as the anolyte.

The cathodic reduction of thiosulfate ions is carried out in the cathode compartment with the temperature of the hydrosulfite solution as the catholyte being maintained in the range of from about 0° to about 25° C., and preferably from about 5° C. to about 10° C. The decomposition of thiosulfate ions takes place while applying currents at low amperage and maintaining low voltage in the cathode compartment. For example, current densities in the range of from about 0.0001 to about 0.01 $KA/m^2$ based on the actual total cathode surface area.

Cathodes which can be used in the process of the invention are those which provide high surface areas and include sheets, plates or foils, as well as porous structures which readily permit the flow of solution through the pores or openings of the cathode structure.

Suitable porous structures include expanded metal meshes or multi-layered cathodes which have at least one layer having a porosity of at least 60 percent, and preferably from about 70 to about 90 percent, the porosity being the percentage of void volume. Examples of multi-layered cathodes which may be used include those of U.S. Pat. No. 4,761,216, issued Aug. 2, 1988 to D. W. Cawlfield and incorporated by reference herein. Any conductive materials which are stable in alkaline solutions may be used as the cathode. Suitable cathode materials include, for example, graphite and related carbons, stainless steel, copper and alloys thereof, and nickel or nickel-chrome based alloys. In addition noble metals i.e. platinum, gold, palladium or mixtures or alloys thereof, or thin coatings of such materials on valve metals such as titanium, can be employed.

The process of the invention can be operated batchwise or continuously.

In a preferred embodiment, the sulfide ions formed by the decomposition of the thiosulfate ions are removed from the hydrosulfite product. This can be accomplished, for example, by the addition of a sulfide precipitating amount of any metal whose ions react with the sulfide ions to form an insoluble sulfide. Preferably, the sulfide removal takes place without the metal ions reacting with, for example, the hydrosulfite ions present in the Product solution. Suitable metal ions for removing the sulfide ions include, for example, copper, iron, and cobalt. The insoluble metal sulfide formed may be removed from the hydrosulfite solution by any suitable solid-liquid separation method such as filtering, centrifuging, and the like. Sulfide precipitating amounts include those which reduce the sulfide concentrations to acceptable levels. Preferably the precipitating amounts provide substantially molar equivalents of metal ions to the sulfide ions present. Higher or lower concentrations may be used providing undesirable concentrations of sulfide ions or dissolved metal ions are not present in the treated product.

It is desirable that the positive charged metal ions added to react with the sulfide ions be substantially removed from the solution in the sulfide precipitate and not remain in the product after separation of the metal sulfide.

The process of the present invention is further illustrated by the following examples with no intention of being limited thereby. All percentages are by weight unless otherwise specified.

EXAMPLE 1

Sodium hydrosulfite solution containing 80.65 grams per liter (gpl) of $Na_2S_2O_4$, 4.44 grams per liter of sodium thiosulfate, 54.29 grams per liter of sodium sulfite and 10.24 grams per liter of sodium hydroxide at a temperature of 11.2° C. was fed to the cathode compartment of a bipolar membrane cell. The 0.175 square meter cell included two half electrodes, one a cathode and the other an anode and an intermediate bipolar electrode. Two cation exchange membranes separated anode compartments from cathode compartments. The cation exchange membranes were perfluorinated sulfuric acid membranes, having an approximate equivalent weight of 1000, available from the assignee of U.S. Pat. No. 4,470,888. The cathode was a porous layered structure of the type described in U.S. Pat. No. 4,761,216, issued Aug. 2, 1988 to D. W. Cawlfield, having as a first layer a perforated stainless steel plate; stainless steel fibers about 25 microns in diameter as the second layer; a third layer formed of stainless steel fibers about 8 microns in diameter and a mesh wire cloth as the fourth layer which was adjacent to the membrane. The anodes were comprised of nickel 200 rods welded to the anode backplate. A solution of sodium hydroxide containing 100 gpl NaOH was used as the anolyte. Current at 20 amps was passed through the cell resulting in a current density of 0.0011 KA/m$^2$ based on actual total cathode and the voltage was 1.75 volts. During cell operation, the catholyte was circulated at 3 gallons per minute and was analyzed periodically for the thiosulfate concentration, hydrosulfite concentration, sulfite concentration and sodium hydroxide concentration. After 3 hours the thiosulfate concentration could not be detected and the cell operation was discontinued. The results are given in Table I below:

TABLE I

| Time (hrs) | Hydrosulfite* | Thiosulfate* | NaOH* |
|---|---|---|---|
| 0 | 80.65 | 4.44 | 10.24 |
| 1 | 78.25 | 1.12 | 11.15 |
| 2 | 75.92 | .04 | 13.38 |
| 3 | 73.81 | .00 | 15.29 |

*grams per liter

EXAMPLE 2

The procedure of Example 1 was repeated exactly using a sodium hydrosulfite solution containing 131.16 gpl Na$_2$S$_2$O$_4$, 5.82 gpl sodium thiosulfate and 4.70 gpl of NaOH. The results are included in Table II below:

TABLE II

| Time (hrs) | Hydrosulfite* | Thiosulfate* | NaOH* |
|---|---|---|---|
| 0 | 131.16 | 5.82 | 4.70 |
| 1 | 131.47 | 6.97 | 4.44 |
| 2 | 131.44 | 4.39 | 6.18 |
| 3 | 129.01 | 1.82 | 7.24 |
| 4 | 128.31 | 0.49 | 8.26 |

*grams per liter

Examples 1 and 2 illustrate the effective removal of thiosulfate ions in hydrosulfite solutions by the process of the invention.

EXAMPLE 3

A sodium hydrosulfite solution (100 mls), treated by the process of Examples 1 and 2 to convert thiosulfate ions to sulfide ions, was poured into a reaction vessel. To the solution was added 1 gram of copper (I) oxide, Cu$_2$O. The solution was stored for 1 hour at 35° F. and then analyzed. The results are shown in Table III below:

TABLE III

| Time (hrs) | Hydrosulfite* | Thiosulfate* | Sulfide* | NaOH* |
|---|---|---|---|---|
| 0 | 113.44 | Not Det. | 7.85 | 12.30 |
| 1 | 105.71 | Not Det. | 2.30 | 13.36 |
| 3 | 107.24 | Not Det. | 2.21 | 12.69 |

*grams per liter

EXAMPLE 4

The process of Example 3 was repeated exactly using 2 grams of Cu$_2$O. The results are given in Table 4 below:

TABLE 4

| Time (hrs) | Hydrosulfite* | Thiosulfate* | Sulfide* | NaOH* |
|---|---|---|---|---|
| 0 | 113.44 | Not Det. | 7.85 | 12.30 |
| 2 | 106.52 | Not Det. | 0.049 | 15.25 |

*grams per liter

Examples 3 and 4 show that the process of the invention effectively removes from the hydrosulfite solution sulfide ions formed during the decomposition of the thiosulfate ions.

What is claimed is:

1. A process for treating an alkali metal hydrosulfite solution containing thiosulfate ions as an impurity which comprises reducing cathodically the alkali metal hydrosulfite solution to convert thiosulfate ions to sulfide ions, the alkali metal hydrosulfite solution having a residual alkalinity of from about 0.1 to about 20 grams per liter of hydroxide ion.

2. The process of claim 1 in which the alkali metal hydrosulfite is selected from the group consisting of sodium hydrosulfite, potassium hydrosulfite, lithium hydrosulfite, and mixtures thereof.

3. The process of claim 1 accomplished by reducing cathodically the alkali metal hydrosulfite solution at a temperature of from about 10° to about 25° C.

4. The process of claim 1 accomplished by reducing cathodically the alkali metal hydrosulfite solution at a current density of from about 0.0001 to about 0.01 KA/m$^2$.

5. The process of claim 1 in which the alkali metal hydrosulfite solution has an initial thiosulfate ion concentration of at least about 1 gram per liter.

6. The process of claim 1 in which the hydroxide ion is provided by an alkali metal hydroxide, an alkaline earth metal hydroxide or mixtures thereof.

7. The process of claim 5 in which the hydroxide ion is provided by an alkali metal hydroxide selected from the group consisting of sodium hydroxide, potassium hydroxide, lithium hydroxide, and mixtures thereof.

8. The process of claim 2 in which the alkali metal hydrosulfite solution is sodium hydrosulfite.

9. The process of claim 7 in which the source of hydroxide ion is sodium hydroxide.

10. The process of claim 9 in which the alkali metal hydrosulfite solution has a residual alkalinity of from about 4 to about 12 grams per liter of hydroxide ion.

11. A process for removing thiosulfate ions from an aqueous solution of alkali metal hydrosulfite which comprises reducing cathodically the alkali metal hydrosulfite solution to convert thiosulfate ions to sulfide ions, and removing the sulfide ions, the alkali metal hydrosulfite solution having a residual alkalinity of from about 0.1 to about 20 grams per liter of hydroxide ion.

12. The process of claim 11 in which the alkali metal hydrosulfite is selected from the group consisting of sodium hydrosulfite, potassium hydrosulfite, lithium hydrosulfite, and mixtures thereof.

13. The process of claim 11 accomplished by maintaining the reaction mixture at a temperature in the range of from about 10° to about 25° C.

14. The process of claim 11 in which the aqueous solution of alkali metal hydrosulfite has an initial thiosulfate ion concentration is at least about 1 gram per liter.

15. The process of claim 11 accomplished by employing as the source of hydroxide ion an alkali metal hydroxide selected from the group consisting of sodium hydroxide, potassium hydroxide, lithium hydroxide, and mixtures thereof.

16. The process of claim 11 wherein removing the sulfide ions is accomplished by reacting the sulfide ions in the reaction mixture with a positive metal cation which forms an insoluble metal sulfide.

17. The process of claim 16 wherein removing the sulfide ions is accomplished by reacting the sulfide ions in the reaction mixture with copper, iron, cobalt and mixtures thereof.

18. The process of claim 17 wherein removing the sulfide ions is accomplished by reacting the sulfide ions in the reaction mixture with copper (I) oxide.

* * * * *